April 19, 1960     A. J. REPIK ET AL     2,933,454
REACTIVATION OF SPENT ADSORBENT CARBON
Filed Nov. 14, 1955     2 Sheets-Sheet 1

INVENTORS
ALBERT J. REPIK
CLARENCE J. SLOAN, JR.

BY *Cushman Darby & Cushman*
ATTORNEYS 2,933,454
Patented Apr. 19, 1960

United States Patent Office

2,933,454

REACTIVATION OF SPENT ADSORBENT CARBON

Albert J. Repik and Clarence T. Sloan, Jr., Pittsburgh, Pa., assignors to Pittsburgh Coke & Chemical Company, Pittsburgh, Pa., a corporation of Pennsylvania Application November 14, 1955, Serial No. 546,439

9 Claims. (Cl. 252—419)

The present invention relates to an improved process and apparatus for the continuous reactivation of spent adsorbents. More specifically, this invention relates to such a process and apparatus for the continuous reactivation of spent adsorbent carbon, by first distilling off volatile contaminants and then reestablishing an active surface by controlled treatment with oxidative gases.

An object of this invention is to provide a process and apparatus whereby this reactivation can be accomplished with a much lower investment in equipment than is customary.

Another object of this invention is to provide a method of reactivation which can be controlled closely enough, so that higher cost granular adsorbent carbons can be used, the reactivation of which would be impractically expensive using conventional processes and apparatus, such as a Herreshoff or rotary kiln, for example.

A further object of this invention is to provide a means for reactivating spent adsorbent carbon in granular form which will allow operation at low cost, utilizing the heat of combustion from the reactivation or burn-off stage to carry out preheating and devolatilization of the carbon.

An additional object of the invention is to reactivate adsorbent carbon, using a fluidized bed procedure.

A still further object of the present invention is to reactivate adsorbent carbon, using a fluidized bed procedure in such a manner that a substantial heat balance is maintained throughout the process.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

In the commercial use of granular adsorbent carbon, such as the decolorization of sugar syrups by activated carbon, the adsorbent becomes saturated with various contaminants, some of which are responsible for the color of the syrups. At some particular degree of saturation, the carbon is no longer effective in a practical sense and must be reactivated by some means if the economy of repeated use is to be realized. Such reactivation must accomplish (a) a high degree of recovery in adsorptive power and (b) a low volume loss of the granular adsorbent. These two factors largely determine the economics of reuse, since the required make-up of new adsorbent per unit of purified product will be governed by additions of adsorbent necessary to maintain a workable activity level and to maintain the original volume of adsorbent. It is an important objective of this invention to maintain the activity of the carbon at a high controllable level, so that the volume losses will control the make-up and even these losses will be reduced to a minimum by suitable means of handling.

In the past, it has been proposed to regenerate various catalysts by employing a turbulent bed, i.e., a fluidized bed technique. Illustrative of such proposals are Johnson Patent No. 2,367,281 and Hemminger Patent No. 2,494,337. While there has been an incidental mention in the art of adapting fluidized bed technique to the regeneration of spent adsorbent carbon, the art has not developed any practical way, including essential conditions, whereby the fluidized bed technique can be employed to reactivate spent adsorbent carbon.

It has now been found that, by the use of conditions and apparatus hereinafter set forth, it is possible to successfully adopt dense phase fluidized solids processing technique to the reactivation of finely divided spent adsorbent carbon, so that the activated carbon, fouled with organic material, is returned to its original internal structure and adsorptive capacity.

In order to obtain a completely reactivated carbon that will not undergo slow progressive changes in adsorptive characteristics after repeated reactivations, it is necessary to reopen all the micropores, both large and small, over the entire pore spectrum. Though, the larger pores play the main role in decolorization, the finer ones are, nevertheless, important in removing impurities of low molecular weight, which are often responsible for color development in organic liquors on standing. By the technique herein described, it is possible to restore the pore structure to its original state.

Careful adsorptive tests have shown that, for satisfactory purification of complex mixtures, such as starch hydrolysate or cane sugar liquors, for example, internal surface must be available and accessible to a wide range of molecular species of varying molecular sizes and weights. It has further been found that, in order to remove the smaller sized molecules, a capillary system containing an appreciable number of fine pores (of the order of 15 to 25 angstrom units diameter) are necessary to provide surface accessible to the smaller molecules, but which cannot be penetrated by the larger molecular species (which would be preferentially adsorbed on any surface accessible to both). The nature of the structure, i.e., pore volume or pore area distribution according to pore diameter, may be determined by either water or nitrogen adsorption isotherms or by a series of adsorption tests involving adsorbates of graded molecular size, as is will known in the art.

Experimental reactivations, both in stationary and dense phase fluidized beds, have shown that reactivation proceeds in a step-wise manner, consisting first of thermal cracking and devolatilization and followed by oxidative decarbonization.

Heating alone will remove by volatilization or destructive distillation a portion (often substantial) of the adsorbed impurities. Such removal, however, is always incomplete and leaves on the inner adsorptive surface a carbonized deposit. At this stage, after only one adsorption heating, the carbon possesses a large proportion of its initial decolorizing power, the large pores which are the sites of color adsorption being quite effectively opened up. Repeated adsorption and heating cycles, however, result in a gradual increase in density and decrease in adsorptive power until the adsorbent is very ineffective.

This degradation occurs with bone charcoal in conventional sugar refinery practice when the adsorptive level falls to one-tenth or less of the level of new bone char, at which time the bone char is removed by a density separation as "heavy bone." Activated carbon treated in like manner is degraded and densified even faster than bone char and, eventually, becomes very similar to it in adsorptive character. Once this process has been allowed to progress over several cycles, the carbonized deposit becomes very refractory to oxidation and it becomes increasingly difficult, if not impossible, to remove without burning out the original carbon skeleton, even by controlled oxidation.

The second step necessary for complete reactivation is the removal of non-volatile organic matter by oxidation, and it is an important object of this invention to remove this remaining deposit selectively and to do so immediately and completely after each use so as to maintain the greatest selectivity in the process.

In order to remove the carbonized deposit effectively, while leaving the original activated carbon skeleton intact, thus maintaining its initial hardness, it is of extreme importance to control the oxidative potential of the gases used in burning away the non-volatile deposit from the active surface of the carbon. Factors influencing this potential are (a) gas composition and (b) temperature. In regard to temperature, considerable latitude is possible by control of the gas composition; but as it goes below 1200° F., less and less control of oxidation potential is obtainable if the rate is to be maintained at a practical level. At the high end of the range, both exothermic and endothermic oxidative reactions can take place at reasonable rates, and a careful balance of gas composition can be maintained to effect a high degree of selectivity and control of decarbonization rate. Normally, the temperature is between 750° and 1600° F., and, preferably, between 1200° and 1500° F. Quite unexpectedly, it has been found that, when air is used as the oxidizing gas, the selectivity may be vastly improved by small to moderate additions of steam, even though it is not certain that the steam is a reactant at the temperature employed. Full advantage of this discovery is taken in this invention, thus permitting highly selective reactivation under exothermic conditions at low temperatures.

As indicated above, activated carbon of certain types has been reactivated in decolorizing capacity by air alone, if sufficiently low temperatures are used, though, the resulting exothermic reaction is controlled only with difficulty and appears to localize at the particle surface, leading to external ashing. It is also possible to reactivate with steam as the oxidizing agent in an endothermic reaction, though steam has a different type of action which develops a finer pore system with a lower degree of decolorizing power than does air alone. The reactivation with steam is more uniform throughout the interior of the particle. The steam reaction, however, is known to proceed at a negligible rate in the temperature region where air can be used alone, i.e., 1200° F., or below. It was, therefore, an unexpected result that the addition of steam in small to moderate concentrations to the oxidizing air used in low temperature reactivation resulted in a greatly improved uniformity of activation and increased the activity-yield (activity×weight yield) in respect to both fine and coarse pore development for a given weight of carbonaceous deposit gasified. The oxidation with air is more selective with steam present, despite the fact that the steam-carbon reaction appears unlikely as the causative agent.

The oxygen content of the reactivation gases should be maintained substantially lower than that in the atmosphere. A preferred range is 5 to 10 mol percent oxygen in the gases entering the reactivation zone. The gases leaving the reactivation zone contain only very small amounts of oxygen. The gases entering the reactivation zone contain, in addition to oxygen, nitrogen and steam and possibly small amounts of CO, $CO_2$ and the usual minor contaminants, e.g., argon. Steam or carbon dioxide can be used to some extent to replace the oxygen in the reactivation. Thus, when 5 to 10 mol percent of oxygen is employed, the balance of the gas (95 to 90 mol percent) can be steam or, if air is used as the source of oxygen, there can be present with the 5 to 10 mol percent oxygen, 47 to 73.5 mol percent steam, 21.5 to 43 mol percent nitrogen and about 0.25 to 0.5 mol percent argon. It is possible to use a mixture of 69 mol percent air with 31 mol percent steam and, in fact, there can be used up to 95 mol percent air in the steam-air mixture. Less preferably, air can be used alone without steam. The preferred mol ratio of oxygen to steam is one to 6.5. (The oxygen can be present as pure oxygen or in air, or other diluent-containing gas.)

In addition to the above-mentioned observations on reactivation reactions, it has been discovered that several quite unexpected advantages result from the application of dense phase fluidized bed techniques in the manner set forth below. The reactivation in a fluid bed can be carried out extremely rapidly and, surprisingly, becomes more selective rather than less selective in its action.

It was first observed, when reactivating spent activated carbon from sugar service in a rotary kiln, using an atmosphere containing an appreciable oxygen concentration, that above a certain temperature a few particles falling from the flights would glow brightly to incandescent heat for a very brief interval, and then be quenched upon hitting the cooler carbon layer below. Further experimentation, in which such carbon was preheated to red heat, dropped through the air and collected, showed that these particles were completely reactivated.

It has been found that, by imparting to the air an upward velocity to suspend the particles in a dense phase, this same action is obtained in a fluidized bed with the important advantage that the frequent particle to particle contacts diminishes the possibility of overheating.

On the other hand, in a stationary bed, one depends upon diffusion through the bed to the particle being reactivated. Since the particles exposed on the outer surface of the carbon layer have better gas contact, they will react first and the particles below will undergo surface carbonization before they are ever contacted with an appreciable concentration of oxygen. Even in a stirred and cascading bed, as in the case of the Herreshoff furnace or rotary kiln, the same lack of effective gas-solids contact exists (but to a lesser extent), thus, diminishing the selectivity of reactivation in these instances.

It is a further advantage of the present fluidized bed procedure that the rate of temperature rise of an individual particle in the reactivation zone is so rapid, that a greater portion of the deposit is destroyed by this means than by prior art procedures, while, simultaneously, accomplishing this in a shorter period of time, less time thus being allowed for thermal cracking and formation of tarry deposits in the carbon.

In addition to its effect on selectivity, the shorter retention time at elevated temperatures required for adequate regeneration in the dense phase fluidized bed, according to the present invention will not permit as great a shrinkage and rearrangement of the carbonaceous skeleton to take place. This characteristic results in an increase in volume yield of reactivated product and also is not conducive to undesirable slow progressive changes in pore structure.

It has also been observed that the selective action of the air or oxygen in the fluid bed technique of the invention is improved over conventional methods in that the better gas to solids contact enables oxidation of carbonaceous deposit to commence immediately after vaporization of the volatile matter is complete.

The action of the air or oxygen in effecting selective oxidation in the dense phase fluidized bed is quite different from that in stationary beds, in that the volatile matter is released within the oxidation zone, so that it may be burned in the vapor phase (or by surface combustion on the granules), thereby tending to lower the effective localized oxygen concentration in the vicinity of each particle. In such a fluidized bed then, as soon as devolatilization is essentially complete, reactivation by decarbonization will commence immediately, as the oxidizing gases diffuse into the pores. This leaves no opportunity for further carbonization of the deposit on the surface.

Because of the increased selectivity and improved heat transfer in the oxidative process, it is possible to use higher oxygen concentrations than in non-fluidized techniques. The fact that the higher oxygen concentrations may be used, while still maintaining adequate selectivity in oxidation, permits a unique feature of operation; it is possible to maintain an exothermic overall reaction, thereby permitting the adsorbed deposit to act as its own fuel. It is then only necessary to provide for heat economy by recycling a major portion of the gases, insulating the unit, and providing for heat recovery from the reactivated hot product. It has been found that activated carbon from certain purification processes, e.g., carbon from corn and cane sugar decolorization, contains enough adsorbed deposits of appreciable heat value that the reactivation will maintain itself thermally.

In other words, it is possible to substantially maintain a heat balance around the whole reactivation system. The heat generation by the oxidative reactivation in the reactivation zone, which is the highest temperature zone, is sufficient to provide the heat required for initial drying and devolatilization of the carbon in the volatilization zone, as well as to provide the sensible heat quantities leaving the system with the vent gases and with the reactivated product. In order to achieve this desirable heat balance situation, and at the same time maintain adequate fluidization velocities for the gas, it is essential in most cases to recycle a part of the gas from either the devolatilization zone or from above the reactivation zone and blow it back below the high temperature reactivation zone, e.g., to below the upper cooling zone. It has also been found desirable to blow back part of the gas from above the devolatilization zone to between the devolatilization zone and the reactivation zone.

A further desirable auxiliary method of conserving heat is to cool the product with the air (or oxygen) to be used for reactivation (or combustion). Generally, a part of the air is, therefore, admitted below the lowest cooling zone for this purpose. The air introduced below the lowest cooling zone is normally permitted to bypass the upper, hottest, cooling zone, as it has not been found desirable to treat the still quite hot reactivated carbon with oxygen. In the cooling zones also, the carbon is maintained in a dense phase fluidized bed.

The particular quantities or ratios of flue gas recycle or air used are not critical, but will vary to some extent with the different spent adsorbent carbons employed. The important thing is that these quantities be such as to maintain the heat balance requirements and the temperatures required in the devolatilization and reactivation zones.

Additionally, it has been found preferable to provide for water injection as a cooling means for positive control purposes, e.g., water can be sprayed into the devolatilization zone and/or the gas recycle stream and/or the uppermost fluidized cooling bed. Thus, in the preferred practice, the heat conservation system is set up to conserve a little more heat than necessary to obtain a more readily regulated system.

Another major advantage of the present fluidized operation is the reduction of abrasive attrition of the carbon particles undergoing reactivation, as compared with conventional processes, e.g., Herreshoff furnaces or rotating kilns.

Since in a fluidized bed each particle of carbon is surrounded by a film of rapidly moving gas, tending to cushion it in contact with neighboring particles, and since each particle is free to recoil from impact with other particles, the major portion of attrition loss is the result of friction against the walls of the vessel, the area of which is kept to a minimum in this invention.

To insure the successful operation of this invention, adequate analytical control of the product should be maintained through sensitive adsorptive tests which are utilized as the basis for adjustments in the operating conditions of the reactivator unit. Such tests should include (1) a decolorizing or purification or performance test, preferably based on impurities in the process stream (in most cases, this will give control of the larger size pores) and (2) a test capable of detecting changes of the fine pore structure of the adsorbent. Tests typical of type 1 are the corn starch hydrolysate, hydrol and molasses decolorizing determinations. Those typical of type 2 are the iodine and nitrogen adsorption tests.

(1a) The decolorizing power of the reactivated carbon should be equivalent or slightly above that of the virgin carbon. In the case of carbons used in the purification of corn starch hydrolysate liquors, this may be determined by decolorization tests on the plant process liquor. Similarly, this test may be satisfactorily approximated by testing the decolorization of a diluted solution of caustic-treated corn sugar molasses (called caustic-treated hydrol). In this test, the granular carbon is ground to 90%, passing 325 mesh screen, and weighed portions of this are mixed with the dilute boiling hydrol solution and stirred mechanically for twenty minutes. After filtering off the carbon, the color of the initial and final solutions are compared on an electrophotometer. The same procedure is carried out on a sample of standard virgin carbon of the same type. For each carbon, a plot is drawn of the percent color removed per unit weight of carbon used against the final color concentration on logarithmic coordinates. The color capacities of the sample and standard are then compared at the same final color (e.g., 80 to 90% color removed) and the percentage color capacity of the sample relative to the standard is reported as hydrol number or hydrol R.E. (relative efficiency). This value should, therefore, be 95 to 115% in a well-controlled operation.

(1b) In the case of carbon used for cane sugar decolorization, a determination of relative efficiency may be made in the same manner as with hydrol described above, except that a plant stream sugar liquor is employed. As an alternate procedure, a determination of the molasses number may be made by the method of Hassler, employing a known carbon standard. The molasses number should again be equivalent or slightly above that of the virgin carbon, e.g., 95 to 115% of virgin carbon.

(2a) To test the extent of fine pore development, a determination of the iodine number is made. Since the iodine-potassium iodide complex is very small, it will penetrate pores down to about 10 Angstrom units, so that the extent of iodine adsorption at a specified final concentration is proportional to the total surface area in pores of 10 Angstroms diameter or larger. Since, in most activated carbons, the major portion of surface area is contributed by pores from 10 to 30 Angstroms diameter, this test is a good measure of fine pore development.

The iodine number is determined by wetting a series of weighed portions (.8 to 2.0 g.) of the ground carbon in 5% HCl and heating to boiling following by a 30 seconds contact with 100 ml. of iodine in potassium iodide (1.5 parts KI to 1 part $I_2$) during which the flask is vigorously shaken. The resulting solution is immediately filtered, the first 20 to 30 ml. of filtrate discarded and 50 ml. collected and titrated with 0.1 N sodium thiosulfate, using starch indicator. The weight of iodine adsorbed (per gram of carbon) for each portion is calculated, and the values plotted against the normality of the final carbon-treated solution on logarithmic coordinates. The iodine number is read from the capacity curve at .02 N iodine concentration as mg. adsorbed per gram of carbon.

As indicated by this test, though the correlation is not direct and exact, the capacity of the carbon for removing low molecular weight materials may be maintained at the level of virgin carbon if the iodine number is held above 85% of that of the virgin carbon.

A more precise evaluation of the entire pore structure of the reactivated product is obtained from analysis of the water isotherm by the method of Juhola. This gives a series of pore volume increments as a function of diameter which may be translated mathematically into increments of surface area by a simple formula:

$$\Delta A = \frac{4 \Delta V}{r}$$

wherein A is the area, V is the volume and r is the radius of the particle (relating the volume of a cylinder to its wall area). Integration of these increments from 1000 A. down to any specified finer diameter is a measure of total area accessible to any material capable of penetrating to this specified diameter.

TABLE I

| Sample | Temperature of reactivation | Calculated Surfaces area in pores of diameter | | | Hydrol RE, percent | Iodine No., mg./g. |
|---|---|---|---|---|---|---|
| | | over 51A | over 26A | 15 to 23A | | |
| Virgin Carbon (Typical sample) | | 44.5 | 122 | 443 | 100 | 1,000 |
| A | 1,225 | 44.6 | 117 | 390 | 104 | 824 |
| B | 1,426 | 46.9 | 119 | 432 | 100 | 864 |
| C | 1,590 | 50.4 | 127 | 456 | 112 | 910 |
| D [1] | Feed | 41.7 | 110.6 | 381 | 86.4 | 680 |

[1] The pore distribution was determined on a sample degassed under vacuum at 752° F. Hydrol RE and iodine number determined on the material after drying only at 350° F.

In Table I are given calculated surface area increments of a sample of virgin activated carbon and three samples, A, B and C, of the same carbon which was spent in the treatment of corn starch hydrolysate and reactivated in a dense phase fluid bed at different temperatures. Sample D represents the dried saturated carbon used as feed for these runs. In respect to coarse pores (those greater than 50 A.) responsible for removal of large color bodies, such as some of those found in cane sugar solution, the reactivated samples are almost identical with virgin material, except for the "C" sample, which is higher than A and B.

The values obtained for samples B and C were obtained by following the conditions in Examples 2 and 3, infra. The values for sample A were obtained by using conditions substantially identical with Examples 2 and 3, i.e., a gas velocity of 3.2 ft./sec. and a steam to air mol ratio of about 0.46 and a bed depth of one foot in the reactivation bed. The gas velocity in the drying bed was substantially the same as in the reactivation bed in all of samples A, B and C (sample D was not submitted to the reactivation treatment and the velocity of the gas in the drying bed was 3.2 ft./sec.). The drying bed depth was one foot in all cases and the drying bed temperature was about 350° F. in all cases.

It has been found desirable to maintain active turbulence within each fluidized bed in the process, so that no temperature difference substantially greater than 50° F. and, preferably, not over 10° F. exists within any one bed. This maximum permissible temperature difference is especially important in the reactivation bed where the high temperature normally occurs.

Solids' residence time can be maintained relatively uniform in each bed by proper positioning of inlet and outlet devices and by proper selection of bed depth and solids through-put rate. In general, the ratio of maximum to minimum distances from any solids inlet down to the nearest solids outlet point should be no greater than 2 to 1 (when there are a multiplicity of inlet and/or outlet points). The closer this ratio is to 1 to 1, the less violent the degree of fluidization required to insure uniform treatment of the solids. The location of the downcomers in relation to the solids inlets is such as to maintain uniform translational motion throughout the fluid bed. For example, the inlet may be at the center of the bed and outlets spaced uniformly near the periphery of a circular bed. Or, the inlet may be at one end and the discharge at the opposite end of a circular or rectangular bed.

Bed depths between the range of 0.3 to 4 feet have been found satisfactory and a preferred fluidized bed depth is about one foot.

The superficial gas velocity (cubic feet/sec. of gas at conditions divided by the cross sectional area of the apparatus at right angles to the gas flow) in the reactivation and devolatilization zones should normally be in the range of 1.4 to 5 times the minimum fluidization velocity. It is also possible to use such velocities in the cooling zones. The superficial gas velocity is preferably 3.0 to 3.5 ft./sec. in the reactivation zone; 2.5 to 3.0 ft./sec. in the devolatilization zone, and 1.0 to 2.0 ft./sec. in the cooling beds.

The minimum fluidization velocity is defined as that gas velocity calculated as cubic feet per second of gas at bed conditions divided by the gross cross sectional area of the bed which will just support the bed. This can be readily determined by measuring the hydrostatic pressure drop from top to bottom of the bed. When this pressure drop first reaches the calculated weight per unit area of the bed, the minimum fluidization velocity will have been obtained.

When using 8 to 30 mesh (U.S. sieve series) carbon of an apparent density of about 0.5, for example, it has been found preferable to employ the gas velocities in the reactivation, devolatilization and cooling zones recited in the preceding paragraph, the temperature of the gas in the reactivation zone being about 1200° F. The minimum gas velocity is, of course, the minimum fluidization velocity and the maximum gas velocity in the fluidized bed is that velocity at which serious entrainment occurs. For carbon mesh sizes and densities, other than those mentioned in the examples, it is evident that some of the practical limits will be different from the preferred ranges indicated above.

Another feature which has been found desirable in some instances is to inject steam upwardly into the downcomers to avoid accumulations of carbon on the downcomer walls.

In the present specification and claims, the gas percentages are all by volume at S.T.P., unless otherwise indicated.

When fuel gas is employed, it is used in an amount of 0.1% to 5.3% of the total gas introduced into the reactivation bed. Fuel gas can be omitted. The fuel gas is generally natural gas. While, normally, no fuel gas is needed, it can be used in an amount of up to 3800 s.c.f.h. (standard cubic feet per hour) with 4170 lb./hr. of wet carbon feed. The gas introduced into the drying bed generally comprises 40% to 50% steam, 40% to 50% nitrogen (or other inert gas), and 7.5% to 12.5% of CO and $CO_2$.

The gas introduced into the upper cooling bed comprises 60% to 70% steam, 25% to 35% nitrogen (or other inert gas) and 4% to 8% of CO and $CO_2$. The gas introduced into the lowermost cooling bed normally is air, although any inert gas could be used for cooling this bed. Normally, the percentages of the component gases in the cooling beds are not especially critical, although it is desirable to exclude oxygen from the upper cooling bed.

While the percent of exit gas recycled is not critical, but depends to a large extent on the heat balance requirements, it has been found preferable to recycle 20% to 30% of the exit gases. The proportion of recycle gas, introduced between the drying and reactivation beds is normally about 0% to 50% of the total recycle, while the balance of the recycle gas is introduced below the reactivation bed, e.g., in the upper cooling bed.

When steam is used in the downcomers, it is generally about 5% to 20% of the total gas entering the particular bed at the upper end of the downcomer.

The average particle retention time in the drying bed is 0.1 to 1.0 hour, and in the reactivation bed is 0.1 to 1.0 hour.

Inevitably, some fine solids are lifted from the fluidized bed by the gas velocity into the space above the bed. A decrease in the actual gas velocity returns a major portion of the solids to the bed. However, a small amount is carried through the stack and is removed from the gas stream by a cyclone separator and returned to the drying or devolatilization bed. In some applications, it is desirable to remove fines from the material and a carefully designed cyclone will perform this operation at no added expense or an additional cyclone can be employed for this purpose.

The temperature of the carbon, as it is removed from the first cooling bed, is preferably kept below about 500° F. and the solids exit temperature from the last cooling bed is preferably between 100° and 200° F. for satisfactory handling of the material.

With the equipment described in the drawings, it is best to keep the temperature in the drying or devolatilization zone at a maximum of 550° F., the temperature in the reactivation zone at a maximum of 1500° F., in the zone immediately below the reactivation zone at a maximum of 1200° F., in the first cooling zone at a maximum of 600° F., in the second cooling zone at a maximum of 300° F., and in the third cooling zone at a maximum of 200° F.

While the subsequent drawings disclose perforated gas distribution plates, it should be understood that the gas distribution plate can be replaced by a conical bottom gas inlet if desired.

Reference is now made more particularly to the drawings, in which.

Figure 1:
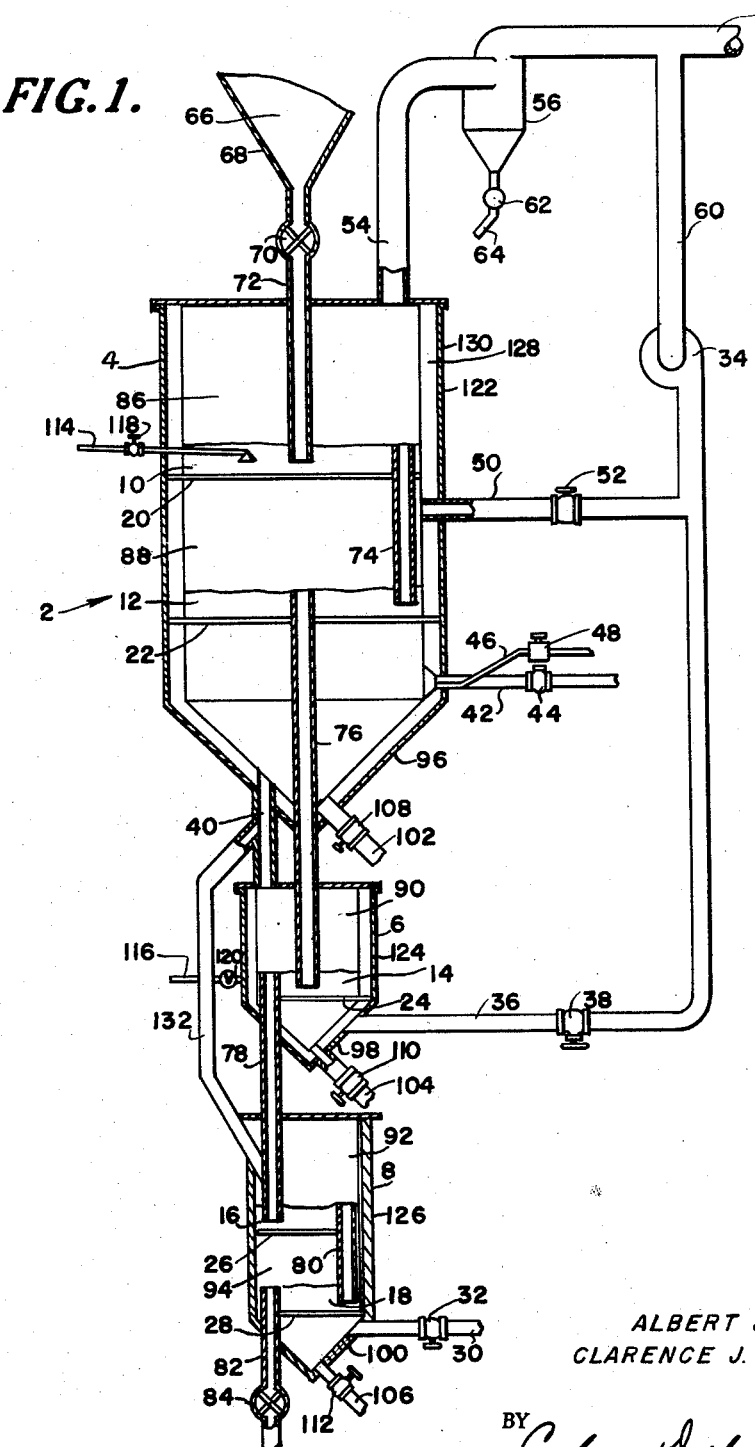
Figure 1 is a vertical section of one form of apparatus suitable to the carrying out of the invention.

In Figure 1, the system includes the reactivator proper, indicated generically at 2, comprising three enlarged vertical chambers or vessels 4, 6 and 8, having a total of five dense phase fluidized beds 10, 12, 14, 16 and 18 in vertically spaced relationship. The uppermost bed 10, in the largest vessel, is the drying or devolatilization bed and the next bed 12, is the reactivation bed. The three remaining beds 14, 16 and 18 are heat-exchangers for product (reactivated carbon) cooling. Each bed is supported by a perforated plate or deck, as shown at 20, 22, 24, 26 and 28. The perforated plates are of appropriate design for good gas distribution. (As is well recognized in the fluidized bed art, in place of each of these gas distribution plates, it is possible to use a conical bottom gas inlet if desired.)

Proper fluidizing gas velocity is realized in each of the beds by the introduction of air (or oxygen) through the pipe 30 and control valve 32 below cooling bed 18 to the last two cooling beds 16 and 18 and by the use of recycle gas propelled by blower 34 through the pipe 36 and control valves 38 to the first stage cooling bed 14. The off gases from the cooling beds 14, 16 and 18 (i.e., the gases which pass through these beds) are combined in pipe 40 and enter the reactivation bed 12. Additional air or oxygen, preferably, is introduced to the reactivation bed through pipe 42 and control valve 44, while fuel gas, or steam, is preferably introduced to the reactivation bed through pipe 46 and control valve 48. (In those cases, distinctly less preferred, where the system is operated without the use of cooling beds 14, 16 and 18, it is, of course, essential to introduce the air and fuel gas through pipes 42 and 46. When the cooling beds are eliminated, there is the disadvantage that it is impossible to maintain a substantial heat balance.)

All gases, passing through the reactivation bed 12 also pass through the drying bed 10. Additionally, recycle gas passes into the drying bed 10 through pipe 50 and control valve 52. The flue gas leaves the system through the duct 54, passes through a cyclone separator 56 and is then vented through pipe 58. A portion of the flue gas is recycled, as described supra, via pipe 60. Solids recovered in the cyclone pass through the pressure lock 62 and a pipe 64 to be returned to the drying bed 10, via pipe 72.

Spent adsorbent material 66, e.g., spent granular carbon, flows from the bin 68 through rotary pressure lock 70, or the equivalent, which controls the solids rate passing through the feed pipe 72. The solids then pass through the drying bed 10 and into the overflow downcomer 74. Each succeeding bed receives and discharges solids through downcomers 76, 78, 80 and 82, respectively. The level of the beds is set by the projection of the downcomers above the perforated plates 20, 22, 24, 26 and 28. The upper end of each downcomer terminates below the next preceding perforated plate or deck and the lower end of each downcomer, except the last one, similarly ends above the next succeeding perforated plate. The lower end of each downcomer should, normally, be no higher than the upper end of the next succeeding downcomer and, preferably, is slightly therebelow, as shown in the drawings and as is well known in the fluidized bed art. Recycle pipe 50 enters vessel 4 above both the upper end of downcomer 76 and the lower end of downcomer 74. The last downcomer 82 serves to discharge the reactivated carbon from the system with the aid of pressure lock 84. Spaces 86, 88, 90, 92 and 94, respectively, are provided above each fluid bed for solids-gas disengaging. Material dropped through the perforated plates 20, 22, 24, 26 and 28, primarily during non-operating periods, is collected in the cone bottoms 96, 98 and 100, and removed through pipes 102, 104 and 106 and valves 108, 110 and 112. Water is admitted for cooling purposes through pipes 114 and 116 and control valves 118 and 120 into the drying bed and first stage cooling bed. The water can be sprayed directly into the beds, as in Figure 1, or, preferably, is sprayed into the space above the zones, as in Figure 2.

Fluctuations in bed temperature, caused by variation in solids feed rate and in moisture content in such incoming solids, are reduced to a minimum by the controlled addition of water and by adjustment of the recycle gas rate, using valves 118 and 52.

As previously indicated, the impurities adsorbed by the carbon during use are burned off by the controlled admission of air or other oxygen containing gas through valves 44 and 32. The oxidation reaction taking place in bed 12 is the heart of the reactivation process. Through carefully controlled conditions, sufficient heat is generated to eliminate the need for outside fuel and, at the same time, the spent carbon is restored to its original activity with a minimum of losses. A sufficient quantity of heat is released to remove the water from the incoming feed in the drying bed 10, and to maintain the unit at operating temperatures. The reactivation bed temperature of 1200° F. to 1500° F. is controlled by the rate of admission of air, by the rate of gas recycled through the control valve 38, and by the rate of admission of water through the control valve 120 to the first cooling stage fluidized bed heat exchanger.

The vessels are, preferably, made of steel shells 122, 124 and 126, with appropriate refractory liners 128 and insulating material 130. Metal parts exposed to extreme temperatures can be constructed of conventional heat resistant alloys.

The air fed through pipe 30 and control valve 32, after passing through the second and third stage cooling beds or heat exchangers 16 and 18, is removed from the upper part of vessel 8 through by-pass pipe 132 and enters the regeneration or reactivation bed 12 through pipe 40.

It is extremely important that substantially oxygen-free gas be employed in the first cooling stage, i.e., bed 14, in order to prevent ignition of the hot carbon. It is for this reason that the oxygen containing gases leaving the second cooling bed 16 are permitted to bypass bed 14 by means of pipe 132.

Figure 2:
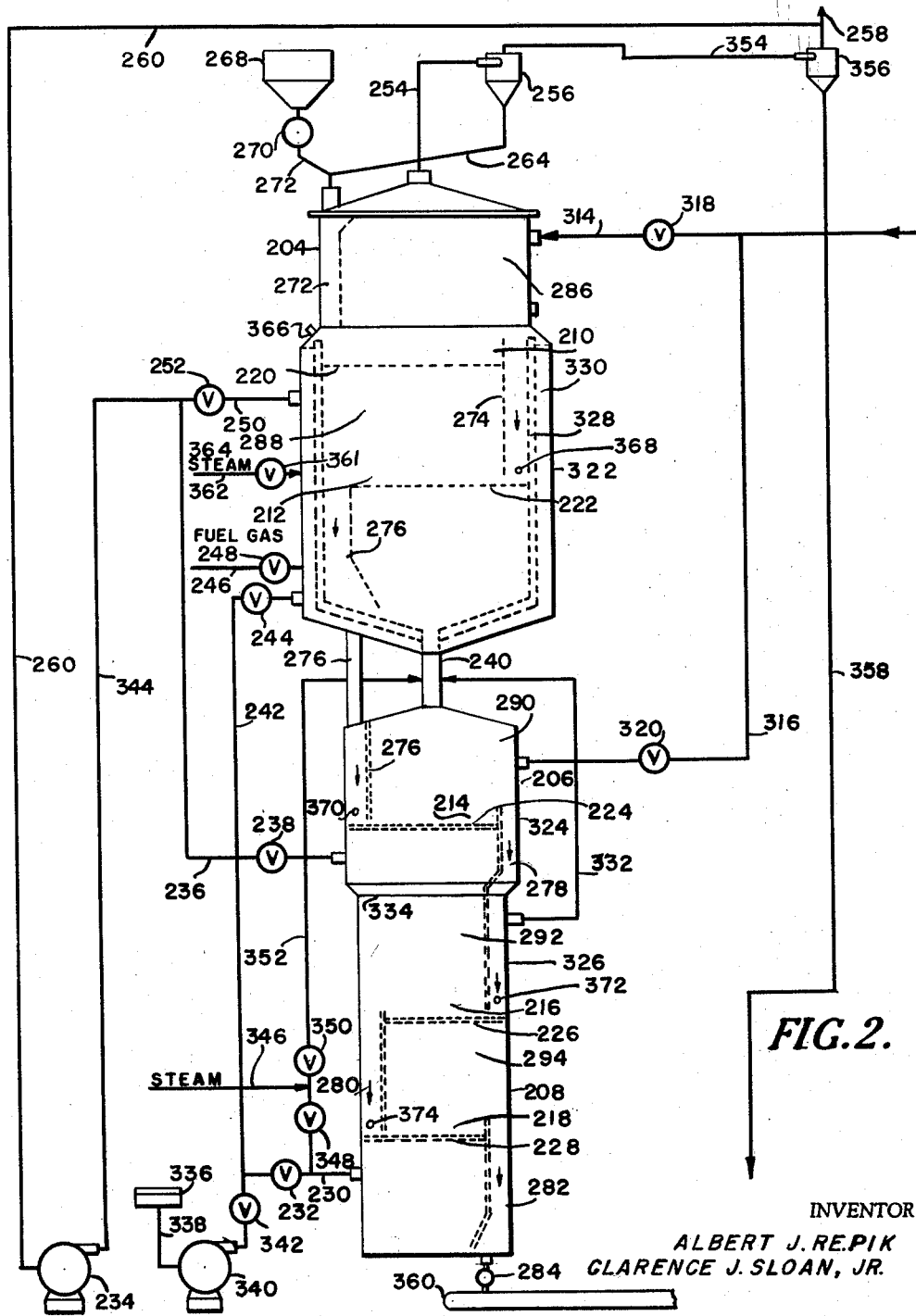
Figure 2 is a schematic flow diagram of another and preferred form of the invention, wherein the reactivator is shown in vertical section.

In the presently preferred form of the invention, as illustrated in Figure 2, the reactivator proper comprises three enlarged vertical chambers 204, 206 and 208, having five dense phase fluidized beds 210, 212, 214, 216 and 218 in vertically spaced relationship. Each bed is supported by a perforated deck, as shown at 220, 222, 224, 226 and 228. Chamber 206 is separated from chamber 208 by solid plate 334, which extends horizontally across the inter-section of the two chambers, except for the space occupied by downcomer 278. Air in introduced through filter 336 and line 338 past blower 340 and valves 342 and 232 below bed 218 through line 230 to the last two cooling beds 216 and 218. Recycle gas is propelled by blower 234 through pipes 344 and 236 and control valve 238 to the first stage cooling bed 214. Steam is introduced through line 346 and, with proper adjustment of valves 348 and 350, can be supplied through pipe 352 to below cooling bed 218 along with air and also can be supplied to the reactivation bed 212 with the aid of connecting pipe 240. The off gases from cooling bed 214, 216 and 218 also are combined in pipe 240 and enter the reactivation bed 212 along with the steam. Additional air also is introduced to the reactivation bed through pipe 242 and control valve 244. By proper manipulation of valves 342, 232, 244, 348 and 350, the rate of air (oxygen) introduction into the lower cooling beds and the reactivation bed can be regulated, as can the ratio of air (oxygen) to steam at these points, it being particularly important to control the ratio of air to steam entering the reactivation bed, as previously set forth.

Fuel gas can be introduced to the reactivation bed 212 through pipe 246 and control valve 248, although it usually is not necessary to employ fuel gas. All gases passing through reactivation bed 212 also pass through drying or devolatilization bed 210. Recycle gas also passes into drying bed 210 through pipe 250 and control valve 252.

By proper adjustment of valves 238 and 252, the proportion of recycle gas is maintained at a value necessary to give the desired heat balance through the system. The flue gas leaves the system through duct 254 and passes through a cyclone separator 256. Solid granular carbon recovered in the cyclone 256 returns via pipes 264 and 272 to the drying bed 210. The flue gas is sent from cyclone 256 via pipe 354 to a second cyclone 356 in which the fines are separated from the gas and pass via line 358 to fines storage or disposal. A portion of the flue gas is recycled, as described supra, via pipe 260 and the balance is vented to the atmosphere through pipe 258.

Spent granular adsorbent carbon flows from line 268 through rotary pressure lock 270 into solids feed pipe 272. Feed pipe 272 extends to a point two feet above deck 220. The carbon then passes through drying bed 210 and into the overflow downcomer 274. Each succeeding bed receives and discharges solids through downcomers 276, 278, 280 and 282, respectively. Each downcomer extends one foot above the adjacent upper deck and a point three inches above the adjacent lower deck. Recycle pipe 250 enters vessel 204 above the upper end of downcomer 276. The last downcomer 282 serves to discharge the reactivated carbon from the system through pressure lock 284 and products conveyor 360. Spaces 286, 288, 290, 292 and 294, respectively, are provided above each fluid bed for solids-gas disengaging. Material dropped through the perforated plates 220, 222, 224, 226 and 228 is removed through hinged vertical manholes (not shown) below the reactivation bed plate 222, below the first cooling bed plate 224 and below the third cooling bed plate 228. Water is admitted for cooling purposes through pipes 314 and 316 and control valves 318 and 320 into the drying bed 210 and first stage cooling bed 214. The water is sprayed above the level of the carbon in the beds. The chambers are made of stainless steel shells 322, 324 and 326 with refractory brick liners 328 and insulating brick coverings 330.

The air fed through pipe 230, after passing through the second and third stage cooling beds 216 and 218, is removed from the upper part of chamber 208, (i.e., in space 292) through bypass pipe 332 and enters the reactivation bed 212 through pipe 240.

To aid in the devolatilization, it is also frequently desirable to add steam through pipe 362 and valve 364. The addition of upwardly directed steam at the points 366, 368, 370, 372 and 374, also, prevents the carbon from clogging the downcomers or the feed pipe. The steam is introduced through a series of three tubes to each downcomer.

In a typical commercial operation, 4000 lbs./hr. of wet spent carbon is fed into the system and 2080 lbs./hr. of regenerated product is recovered. Cooling water is normally supplied at a rate of 1–3 gallons/min. to maintain temperature conditions constant, although it can be as high as 10 gallons/min.

The examples given below typify the operation of the subject process and serve to illustrate its degree of latitude and flexibility. It is not to be construed that any of these examples represent the optimum efficiency attainable by such a process, although they do include the presently preferred operation. The claims are not limited by the conditions and product quality cited herein.

The operability of the heat conservation features of this invention is illustrated by the typical heat balance shown in Table II.

TABLE II

*Heat balance of a typical fluidized drying-reactivation operation*

[60° F. (Reference temperature).]

| Heat Input | M B.t.u./hr. | Heat Output | M B.t.u./hr. |
| --- | --- | --- | --- |
| 1. Spent carbon | 0 | 1. Product carbon | 35 |
| 2. Water on carbon | 0 | 4. Flue gas (includes water removed from carbon and products of combustion) | 2,835 |
| 3. Reaction air | 0 | | |
| 4. Heat of reaction | 2,880 | | |
| | | 5. Losses | 10 |
| Total | 2,880 | Total | 2,880 |

EXAMPLE I

This example illustrates the combined operation of drying and reactivation beds in series on a carbon of normal moisture content. The apparatus used was a pilot scale version of the equipment shown in Figure 1, omitting the three air cooling zones and using one foot wide by two feet long drying and reactivation zones operating under the conditions shown in Table III. The original carbon employed in this example, prior to its contact with sugar refinery liquors, was very high in density and low in adsorptive activity by virtue of the inefficient prior reactivations by conventional methods. Therefore, this reactivation selectively removed, as expected, only the last deposit of organic material, thus restoring the activity of the carbon to its level prior to the last liquor contact. This prior activity level was not known with great accuracy, but was in the range 500±50 iodine number. The difference in bulk density of feed and product indicated the amount of adsorbed impurities burned from the carbon. The increase in iodine number shows a sizable increase in fine pore volume and, consequently, indicated attainment of selective oxidation of the order desired.

TABLE III

*Typical operating conditions of fluidized drying and reactivation bed*

| Operating Variable | Drying Bed | Reactivation Bed |
|---|---|---|
| Temperature, °F | 400 | 1,400 |
| Gas velocity, ft./sec | 2.7 | 3.5 |
| Oxygen rate, mols/hr | 0 | 10.4 |
| Steam rate, mols/hr.[1] | 82.9 | 82.8 |
| Fuel gas rate | 0 | 0 |

[1] The steam is derived from the moisture volatilized from the wet carbon feed during the process. This is an added saving in expense for the present process.

TABLE IV

*Changes in activated carbon properties*

| Property | Spent Carbon | Reactivated Carbon |
|---|---|---|
| Moisture, percent wet basis | 40 | 0 |
| Bulk density, g./cc. (dry) | 0.65 | 0.53 |
| Iodine No. (dry) mg./g | 232 | 460 |

EXAMPLES II AND III

Examples 2 and 3 typify operation of such a fluidized reactivation, using the apparatus of Example I, at higher temperatures on an activated carbon which had been exposed only once to refinery liquors. The activity level of the "virgin carbon" was, consequently, much higher than in the preceding example. Decolorizing activity was completely regained in both cases. In Example III, the selectivity has been adjusted slightly too far toward the decoloring reactivity, causing the fine pore development to be somewhat less than optimum, an optimum obtainable by a shift in conditions within the range provided for. A further and more precise evaluation of the reactivated products is disclosed in Table I above, as samples B and C, respectively, indicating complete reattainment of adsorptive power for both high and low molecular weight impurities. The physical properties are in every way comparable with those of the virgin carbon.

TABLE V

*Operating conditions of fluidized reactivation bed*

| Operating Variable | Example 2 | Example 3 |
|---|---|---|
| Temperature, °F | 1,426 | 1,590 |
| Gas velocity, ft./sec | 3.22 | 3.16 |
| Steam to air mol ratio | 0.45 | 0.47 |
| Depth of bed, ft | 1 | 1 |

The temperature in the drying bed in both Examples 2 and 3 was about 350° F. and the gas velocity the same as in the reactivation bed.

TABLE VI

*Changes in properties of activated carbon by fluidized reactivation*

| | Example 2 | Example 3 |
|---|---|---|
| Physical properties: | | |
| Bulk Density, g./cc.— | | |
| Virgin Carbon | ca. 0.45 | ca. 0.45 |
| Reactivator Feed (dried) | 0.53 | 0.58 |
| Reactivator Product | 0.45 | 0.44 |
| Hardness (Abrasion Resistance)— | | |
| Virgin Carbon | ca. 85 | ca. 85 |
| Reactivator Feed (dried) | 83 | 88 |
| Reactivator Product | 85.8 | 84 |
| Adsorptive Properties: | | |
| Iodine Number, mg./cc.— | | |
| Virgin Carbon | ca. 1,000 | ca. 1,000 |
| Reactivator Feed (dried) | 680 | 569 |
| Reactivator Product | 864 | 910 |
| Decolorizing Power Capacity (Hydrol R.E.) Percent— | | |
| Virgin Carbon | ca. 100 | ca. 100 |
| Reactivator Feed (dried) | 86.4 | 86.4 |
| Reactivator Product | 100 | 112 |

EXAMPLE IV

Using the apparatus of Figure 2, 4000 lbs./hr. of wet spent adsorbent carbon from the treatment of corn sugar liquors and having a bulk density of 0.59 g./cc. (dry) was fed into the system. The devolatilization bed was maintained at 400° F.; the reactivation bed at 1400° F.; the first cooling bed at 330° F.; the second cooling bed at 240° F.; and the third cooling bed at 150° F. Air was introduced into the system at the rate of 44,200 cubic feet/hour (S.T.P.). 70% of the air was introduced below the third cooling bed and the balance introduced below the reactivation bed. Of the total exit gas, 25% was recycled. Recycle gas was introduced into the system in an amount of 28,300 cubic feet/hour (S.T.P.). The recycle gas was 46.4% steam; 9.4% CO and $CO_2$ and 44.2% nitrogen. Of the recycle gas, 40% was introduced below the drying bed and the balance was introduced below the first cooling bed. The gas velocity was maintained at 3.5 ft./sec. in the reactivation bed; at 2.7 ft./sec. in the drying bed; at 1.50 ft./sec. in the first cooling bed; at 1.25 ft./sec. in the second cooling bed; and 1.0 ft./sec. in the third cooling bed. The dry reactivated carbon product was removed from the system at the rate of 2080 lbs./hr.

In the examples there was no need to introduce steam from an external source. Of course, if the reaction begins to get out of control, external steam can be added to control it.

The changes in properties of the product and a comparison with virgin carbon of the type employed in Example IV, are as follows:

| | Physical Properties | | Adsorptive Properties | |
|---|---|---|---|---|
| | Bulk Density (g./cc.) | Hardness (Abrasion Resistance) | Iodine Number, mg./gm. | Decolorizing Power Capacity (Hydrol R.E.) percent |
| Virgin Carbon | 0.45 | 70 | 1,000 | 100.0 |
| Reactivator Feed (Dried) | 0.52 | 84 | 692 | 86.4 |
| Reactivator Product | 0.45 | 74 | 957 | 100.0 |

In Example IV whenever clogging occurred in any downcomer steam was introduced at a rate of 2.5 ft./sec. until clogging was overcome, whereupon the flow of steam to the downcomer was stopped.

We claim:

1. A process for reactivation of spent adsorbent carbon, comprising introducing spent adsorbent carbon into a first devolatilization zone, maintaining said spent carbon in said devolatilization zone in a dense phase fluidized state at a temperature between about 250° and 800° F. with the aid of a gas substantially devoid of oxygen to remove volatiles from said spent carbon and then transferring the spent carbon to a second, reactivation zone wherein the carbon is maintained in a dense phase fluidized state in the presence of an oxygen-containing gas wherein the oxygen content of the gas is between about 5 and 10 mol percent of the total gases at a temperature of from about 1200° to 1600° F. to burn off non-volatile deposits from the active surface of the carbon and recovering the reactivated carbon from said second zone.

2. A process according to claim 1, wherein in addition to oxygen the gases in the reactivation zone include steam.

3. A process according to claim 1, including the step of maintaining sufficient turbulence within each of the fluidized beds of the spent carbon that no temperature difference substantially greater than 50° F. exists within each bed.

4. A process according to claim 1, wherein the superficial gas velocity in both the devolatilization and reactivation zones is maintained between 1.4 and 4 times the minimum fluidization velocity.

5. A process according to claim 4, wherein the carbon is of 8 to 30 mesh size and has an apparent density of about 0.5, the gas velocity is about 3.0 to 3.5 ft./sec. in the reactivation zone and about 2.5 to 3.0 ft./sec. in the devolatilization zone and the temperature of the reactivation zone is about 1200° to 1500° F. and wherein the fluidized beds of spent carbon have a depth of about 0.3 to 4.0 feet.

6. A process for the continuous reactivation of spent adsorbent carbon comprising introducing spent adsorbent carbon into a first and upper vertical devolatilization zone, maintaining said spent carbon in said devolatilization zone in a dense phase fluidized state at a temperature between about 250° and 800° F. with the aid of a gas substantially devoid of oxygen passing upwardly through said spent carbon to remove volatiles therefrom, downwardly withdrawing spent carbon from said devolatilization zone to a reactivation zone in a manner to maintain a substantially solid stream of carbon between said devolatilization zone and said reactivation zone, maintaining the spent carbon in a dense phase fluidized state in the reactivation zone with the aid of an oxygen-containing gas wherein the oxygen content of the gas is between about 5 and 10 mol percent and substantially the balance of the gas is steam together with inert gases passed upward therethrough at a temperature of from 1200° to 1600° F. to burn off non-volatile deposits from the active surface of the carbon, downwardly withdrawing the reactivated carbon from said reactivation zone to a cooling zone in a manner to maintain a substantially solid stream of carbon between said reactivation zone and said cooling zone, maintaining the reactivated carbon in a dense phase fluidized state in the cooling zone, recycling a portion of the gas from above the reactivation zone to a point below the reactivation zone and reheating said recycled gas by passing it upwardly through the reactivation zone so that it can aid in devolatilization of the carbon in the devolatilization zone, and introducing at least a portion of the oxygen-containing gas below the cooling zone so that the reactivated product is at least partially cooled by the countercurrent flow of the oxygen-containing gas and recovering the reactivated carbon.

7. A process according to claim 6, wherein steam is introduced upwardly into the solid stream of carbon passing downwardly from the devolatilization zone to the reactivation zone.

8. A process according to claim 6, wherein water is introduced into at least one of the devolattilization zones, the gas recycle stream and the cooling zone to maintain the reactivation system in heat balance.

9. A process according to claim 6, wherein there are employed a plurality of cooling zones in vertical arrangement, downwardly withdrawing the reactivated carbon from an upper cooling zone to the next lower cooling zone in a manner to maintain a substantially solid stream of carbon between said upper cooling zone and said lower cooling zone; recycling a portion of the gas from above the devolatization zone to between the devolatization zone and the reactivation zone, recycling a further portion of the gas from above the devolatization zone to below the uppermost cooling zone and above the next most uppermost cooling zone, introducing at least a portion of the oxygen-containing gas below said next uppermost cooling zone, any additional oxygen-containing gas being introduced below the reactivation zone and above the first cooling zone, and transmitting the oxygen-containing gas from above the said next uppermost cooling zone to above the uppermost cooling zone and below the reactivation zone.

References Cited in the file of this patent

UNITED STATES PATENTS

| | | |
|---|---|---|
| 2,356,680 | Marancik et al. | Aug. 22, 1944 |
| 2,443,056 | Richker | June 8, 1948 |
| 2,587,425 | Adams et al. | Feb. 26, 1952 |
| 2,604,384 | Border et al. | July 22, 1952 |
| 2,608,473 | Stephens | Aug. 26, 1952 |
| 2,616,858 | Gillette et al. | Nov. 4, 1952 |
| 2,788,311 | Howard et al. | Apr. 9, 1957 |